US012341258B2

(12) United States Patent
Harper et al.

(10) Patent No.: US 12,341,258 B2
(45) Date of Patent: Jun. 24, 2025

(54) COUPLED CHASSIS ANTENNA SYSTEM

(71) Applicant: Microsoft Technology Licensing, LLC, Redmond, WA (US)

(72) Inventors: Marc Harper, Snohomish, WA (US); Nazy Ranjkesh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 18/067,468

(22) Filed: Dec. 16, 2022

(65) Prior Publication Data

US 2024/0204406 A1 Jun. 20, 2024

(51) Int. Cl.
*H01Q 5/307* (2015.01)
*H01Q 1/22* (2006.01)
*H01Q 9/04* (2006.01)

(52) U.S. Cl.
CPC ........... *H01Q 5/307* (2015.01); *H01Q 1/2266* (2013.01); *H01Q 9/0421* (2013.01)

(58) Field of Classification Search
CPC .... H01Q 5/307; H01Q 1/2266; H01Q 9/0421; H01Q 5/378; H01Q 9/0457
See application file for complete search history.

(56) References Cited

U.S. PATENT DOCUMENTS 7,079,079 B2 * 7/2006 Jo ........................ H01Q 9/0442 343/702
9,350,068 B2 5/2016 Guterman
11,233,311 B2 1/2022 Kim et al.
2019/0199000 A1 * 6/2019 Gambahaya ........... H01Q 1/243
2020/0036097 A1 1/2020 Liu
2021/0167485 A1 * 6/2021 So ............................ H01Q 1/42
2021/0242566 A1 8/2021 Kim
2023/0163487 A1 * 5/2023 Ma ....................... H01Q 9/0421 343/702

(Continued)

FOREIGN PATENT DOCUMENTS

CN 112311916 A * 2/2021
WO 2021188094 A1 9/2021

OTHER PUBLICATIONS

International Search Report and Written Opinion received for PCT Application No. PCT/US23/035682, Feb. 6, 2024, 15 pages.

(Continued)

*Primary Examiner* — Dimary S Lopez Cruz
*Assistant Examiner* — Anna N Hamadyk
(74) *Attorney, Agent, or Firm* — Holzer Patel Drennan

(57) ABSTRACT

A computing device includes a first metal computing device chassis component including an aperture, a second metal computing device chassis component including a display, and a hinge connector mechanically and movably connecting the second metal computing device chassis component to the first metal computing device chassis component. The computing device includes a primary antenna positioned within the first metal computing device chassis component, the primary antenna being configured to radiate radiofrequency signals at a first radiofrequency bandwidth through the aperture in the first metal computing device chassis component and to capacitively couple to the second metal computing device chassis component to radiate radiofrequency signals at a second radiofrequency bandwidth.

22 Claims, 7 Drawing Sheets

(56) References Cited

U.S. PATENT DOCUMENTS

| | | | | |
|---|---|---|---|---|
| 2023/0198123 | A1* | 6/2023 | Tamrakar | H01Q 1/36 343/702 |
| 2023/0350467 | A1* | 11/2023 | Chang | G06F 1/1681 |

OTHER PUBLICATIONS

Chen, et al., "Integrated MIMO Slot Antenna on Laptop Computer for Eight-Band LTE/WWAN Operation", In the Journal of IEEE Transactions on Antennas and Propagation, vol. 66, Issue 1, Nov. 30, 2017, pp. 105-114.

* cited by examiner

COUPLED CHASSIS ANTENNA SYSTEM

BACKGROUND

Modern computing devices typically include multiple antennas to support multiple wireless protocols and multiple radiofrequency bandwidths. Many modern computing devices are also at least partially enclosed in metal computing device chassis components.

SUMMARY

In some aspects, the techniques described herein relate to a computing device including: a first metal computing device chassis component including an aperture; a second metal computing device chassis component including a display and a hinge connector mechanically and movably connecting the second metal computing device chassis component to the first metal computing device chassis component; and a primary antenna positioned within the first metal computing device chassis component, the primary antenna being configured to radiate radiofrequency signals at a first radiofrequency bandwidth through the aperture in the first metal computing device chassis component and to capacitively couple to the second metal computing device chassis component to radiate radiofrequency signals at a second radiofrequency bandwidth.

In some aspects, the techniques described herein relate to a method of communicating radiofrequency signals from a computing device, the method including: exciting a primary antenna positioned within a first metal computing device chassis component including an aperture, wherein the first metal computing device chassis component is mechanically and movably coupled to a second metal computing device chassis component by a hinge connector and the second metal computing device chassis component includes a display, the primary antenna being configured to radiate the radiofrequency signals at a first radiofrequency bandwidth through the aperture in the first metal computing device chassis component and to capacitively couple to the second metal computing device chassis component to radiate the radiofrequency signals at a second radiofrequency bandwidth.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

DETAILED DESCRIPTIONS

Figure 1:
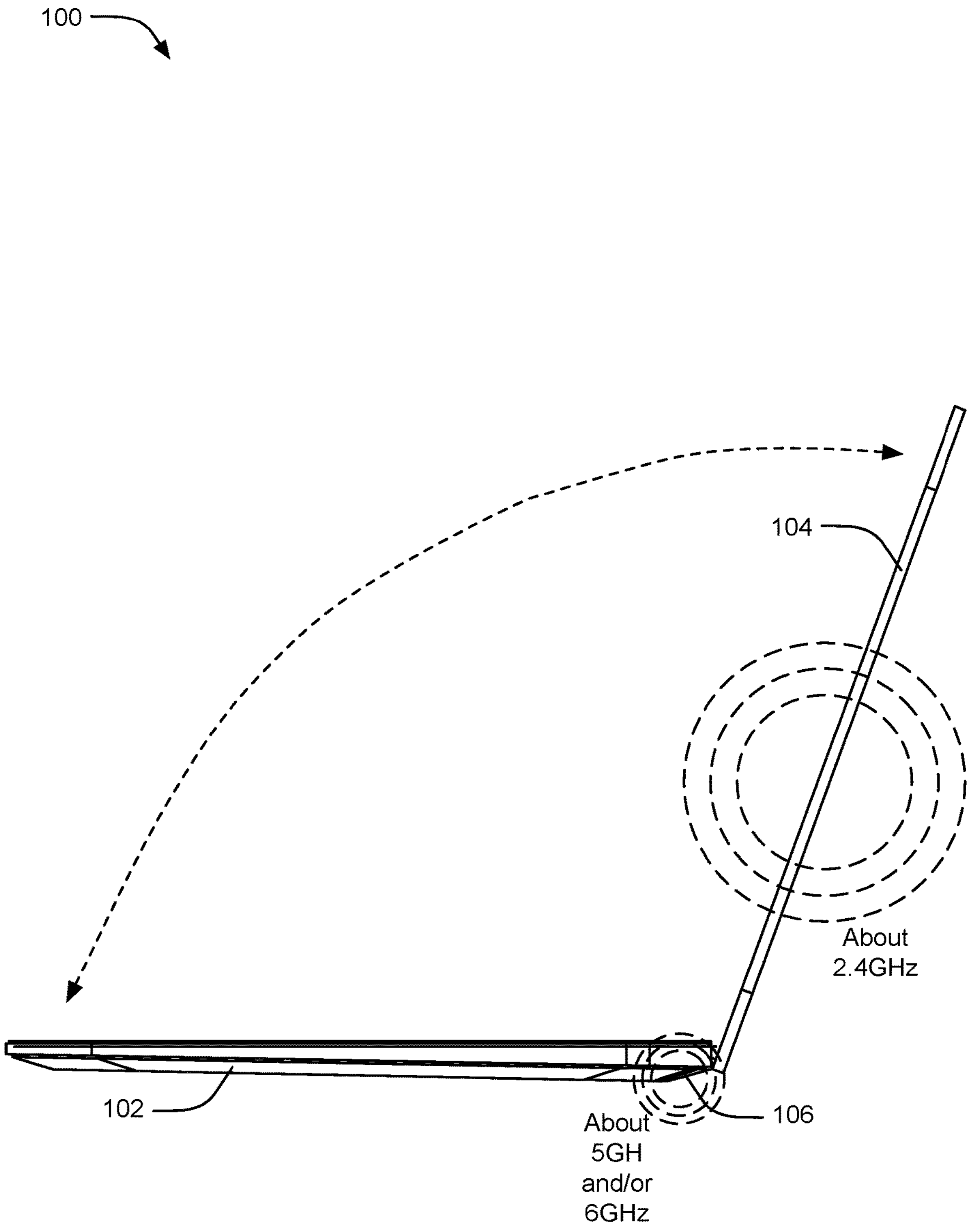
FIG. 1 illustrates a computing device including two metal computing device chassis components.

Industrial designers favor metal chassis designs for many reasons, including aesthetics, durability, security, etc. Placement of radiofrequency (RF) antennas within a metal chassis of a computing device, however, can be challenging. The metal chassis can act as an RF shield to the RF signals communicated via the antennas. An RF shield substantially or completely attenuates the propagation of RF signals through the RF shield. In contrast, an RF window in the metal chassis substantially or completely propagates RF signals through the metal chassis. However, adding extra apertures in metal computing device chassis components to act as RF windows or as supplemental radiators, even when the apertures are filled with a dielectric, is disfavored, as the additional apertures are perceived as reducing the aesthetic appeal and strength of the metal computing device chassis component, increasing manufacturing costs, etc. Accordingly, the described technology can employ apertures used for other purposes to act as effective RF windows and/or radiators, thereby reducing or eliminating the need for extra apertures. Furthermore, for RF signals at frequencies that are not effectively passed by and/or radiated from the aperture, the described technology radiates the RF signals by capacitively coupling to a second metal computing device chassis component, which acts as the dominant radiator at these frequencies.

As a rule of thumb, a metal chassis containing a primary antenna generally acts to attenuate RF signals radiating from the antenna so that the RF signals do not effectively emanate from the metal chassis. However, an aperture in the metal chassis can, in some cases (e.g., certain frequency bands), substantially propagate and/or radiate some of these RF signals outside the metal chassis, either by acting as an RF window or by acting as a supplemental radiator to the primary antenna in the chassis. In other cases (e.g., for other frequency bands), the aperture does not effectively propagate and/or radiate some of these RF signals outside the metal chassis. The described technology provides an alternative RF signal radiator to dominate and/or supplement RF signals that are not propagated and/or radiated outside the metal chassis In general, the dimensions of an aperture, the distance between the primary antenna and the aperture, and internal RF shields (e.g., internal metal components) positioned between the primary antenna and the aperture can attenuate the strength of RF signals emanating from the aperture. In one implementation, the width of a venting aperture (along an axis from the back to the front of the computing device) is ~4.5 mm, and the length of the venting aperture (along an axis from one side of the computing device to the other side) is ~237.0 mm. Furthermore, a 2.4 GHz Wi-Fi signal is substantially within the frequency band from 2.40 GHz to 2.48 GHz, yielding a wavelength range of 12.088 cm to 12.491 cm; a 5 GHz Wi-Fi signal is substantially within the frequency band from 5.170 GHz to 5.835 GHz, yielding a wavelength range of 5.138 cm to 5.799 cm; and a 6 GHz Wi-Fi signal is substantially within the frequency band from 5.925 GHz to 7.125 GHz, yielding a wavelength range of 4.208 cm to 5.060 cm. With these aperture and signal parameters, and depending on the dimensions and placement of the aperture relative to a primary antenna, the primary antenna can capacitively couple with the aperture to effectively radiate the aperture at 5 GHz and 6 GHz, whereas the primary antenna does not capacitively couple with the aperture to effectively radiate at 2.4 GHz. Furthermore, such an aperture more effectively acts as an RF window for these higher-frequency bands.

The described technology provides technical benefits including reducing apertures in the metal computing device chassis components by re-using venting apertures and/or other structures in a metal chassis as RF windows and/or RF radiators. Smaller apertures can fail to pass and/or effectively radiate lower-frequency RF signals having longer wavelengths while passing and/or effectively radiating higher-frequency RF signals having shorter wavelengths. Furthermore, by using a combination of apertures and cross-chassis-component coupling for different RF bands, the described technology can enhance the RF signal strength emanating from a metal computing device across multiple bands. For some RF bands, radiation through an aperture provides sufficient signal strength; for other RF bands, the aperture attenuates the signal strength too much—in the latter case, capacitive coupling to a chassis component to radiate such signals overcomes the attenuation through the aperture. Accordingly, in some implementations, the described technology includes a primary antenna that radiates the higher frequency RF signals through such apertures in a metal computing device chassis component (such as venting apertures) and capacitive couples to the same or different metal computing device chassis component (such as a computing device display) to radiate the lower frequency signals that would be significantly attenuated by the apertures.

FIG. 1 illustrates a computing device 100 including a metal computing device chassis component 102 and a metal computing device chassis component 104. The metal computing device chassis component 102 encloses a primary antenna (not shown) positioned near a venting aperture 106 located in an exterior metal frame of the metal computing device chassis component 102. The primary antenna effectively radiates certain RF signals through and/or by the venting aperture 106 having dimensions larger than half the wavelength of the RF signals, substantially passing (e.g., as an effective RF window) RF signals in some frequency bands (e.g., 5 GhZ and 6 GHz Wi-Fi signals), but the metal computing device chassis component 102 substantially shields and/or otherwise attenuates RF signals in other frequency bands (e.g., 2.4 GhZ Wi-Fi signals), despite the presence of apertures in the metal computing device chassis component 102.

Accordingly, for lower frequency RF signals for which the venting aperture 106 acts to substantially attenuate the signals, the primary antenna capacitively couples to the metal computing device chassis component 104 to excite the metal computing device chassis component 104 (e.g., including a display, not shown, within the metal computing device chassis component 104) at these lower frequencies. As such, the metal computing device chassis component 104 more effectively radiates the lower frequency signals than the venting aperture 106 can pass or radiate them. The primary antenna (such as a PIFA antenna) includes a matching circuit (such as Pi-network matching circuit) to tune the capacitively-coupled metal computing device chassis component 104 to the lower frequency. It should be understood that changing the dimensions of the venting aperture 106 will also change the frequencies of RF signals that are passed or attenuated by the metal computing device chassis component 102 and the venting aperture 106. It should be understood that RF signals in other frequency bands can also be radiated by the metal computing device chassis component 104 in the described manner—a challenge is to configure the computing system so as to achieve acceptable RF signal strength at all frequency bands supported by the computing system.

Figure 2:
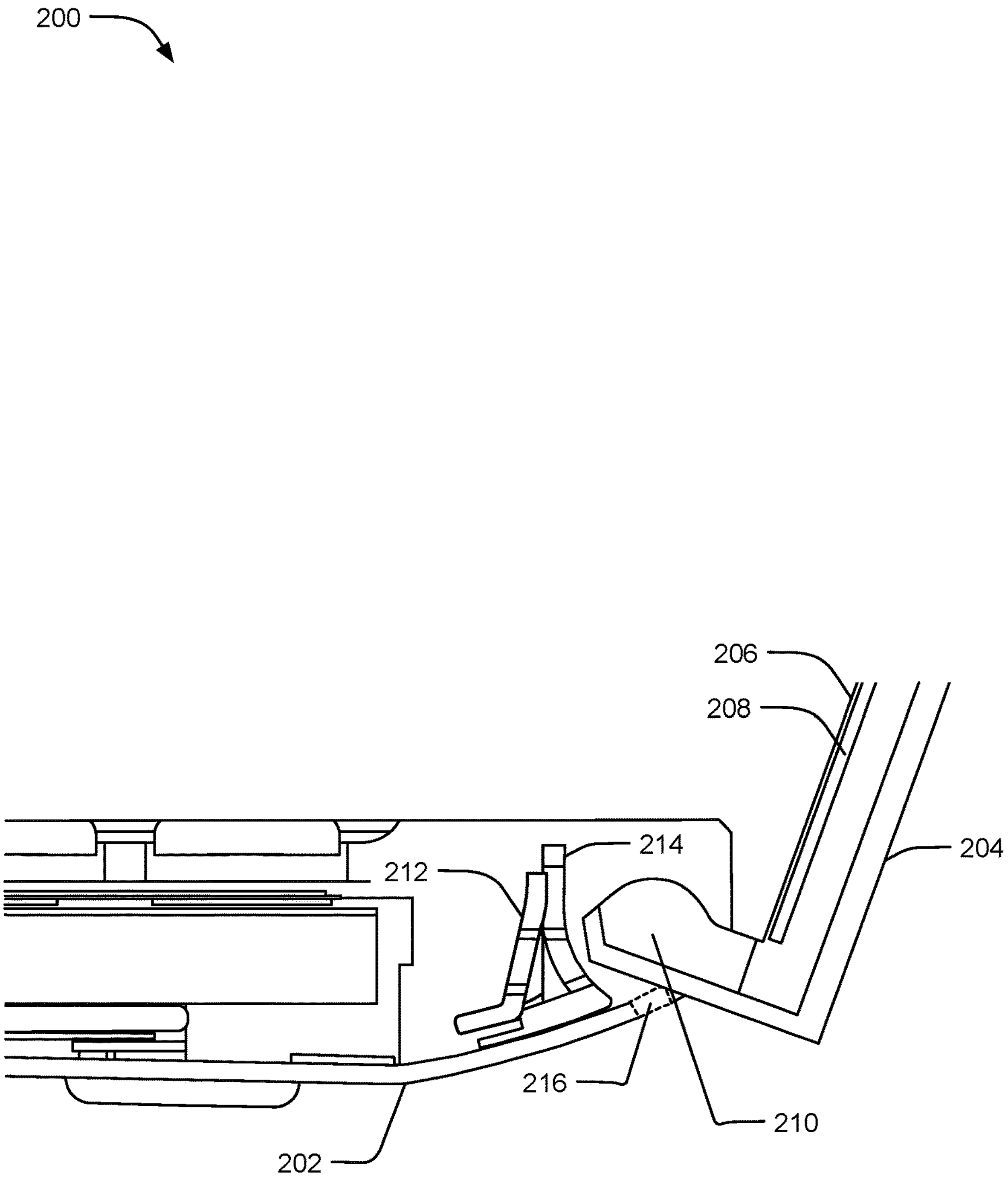
FIG. 2 illustrates a cross-sectional view of an example computing device having a coupled chassis antenna system.

FIG. 2 illustrates a cross-sectional view of an example computing device 200 having a coupled chassis antenna system. The computing device 200 includes a first metal computing device chassis component 202 and a second metal computing device chassis component 204, the latter of which includes a cover glass 206 and houses a display 208 that includes substantial metal material. The first metal computing device chassis component 202 and the second metal computing device chassis component 204 are mechanically and movably connected to each other by one or more hinge connectors 210, which contain substantial metal material in some implementations.

The first metal computing device chassis component 202 encloses a primary antenna 212, which is supported by an antenna bracket 214 (typically made from a dielectric material). In one implementation, the computing device 200 includes two such antenna/bracket pairs, one on each side of the computing device 200, although other implementations may include more or fewer such pairs at various locations in the computing device 200. One or more transceivers (not shown) are electrically connected to excite the primary antenna 212 to radiate RF signals in various frequency bands.

The first metal computing device chassis component 202 substantially encloses the internal components of the computing device 200 with one or more metal surfaces and includes an aperture 216 along its bottom. As shown in other FIGS., the aperture 216 extends along the bottom of and substantially from side-to-side in the computing device 200, although other locations and configurations may be employed. In FIG. 2, the aperture 216 is illustrated as interior to the cross-sectional cut, although other configurations may be employed. In this configuration, RF signals radiated from the primary antenna 212 are not substantially shielded from the aperture 216 by metal components within the first metal computing device chassis component 202, such as the one or more hinge connectors 210. Accordingly, select RF signals for which the aperture 216 acts as an RF window are effectively radiated through the aperture 216 during operation.

For RF signals that the aperture 216 does not act to effectively propagate and/or radiate, the primary antenna 212 capacitively couples to the second metal computing device chassis component 204, including the display 208, via the one or more hinge connectors 210. The primary antenna 212 is tuned via an RF matching component (not shown) to cause the second metal computing device chassis component 204 to radiate these RF signals that are substantially shielded by the first metal computing device chassis component 202, despite the presence of the aperture 216. The second metal computing device chassis component 204 includes the one or more hinge connectors 210 (which typically includes metal material), the display 208, and other metal elements that can radiate the RF signals outside the shielded limits of the first metal computing device chassis component 202.

Figure 3:
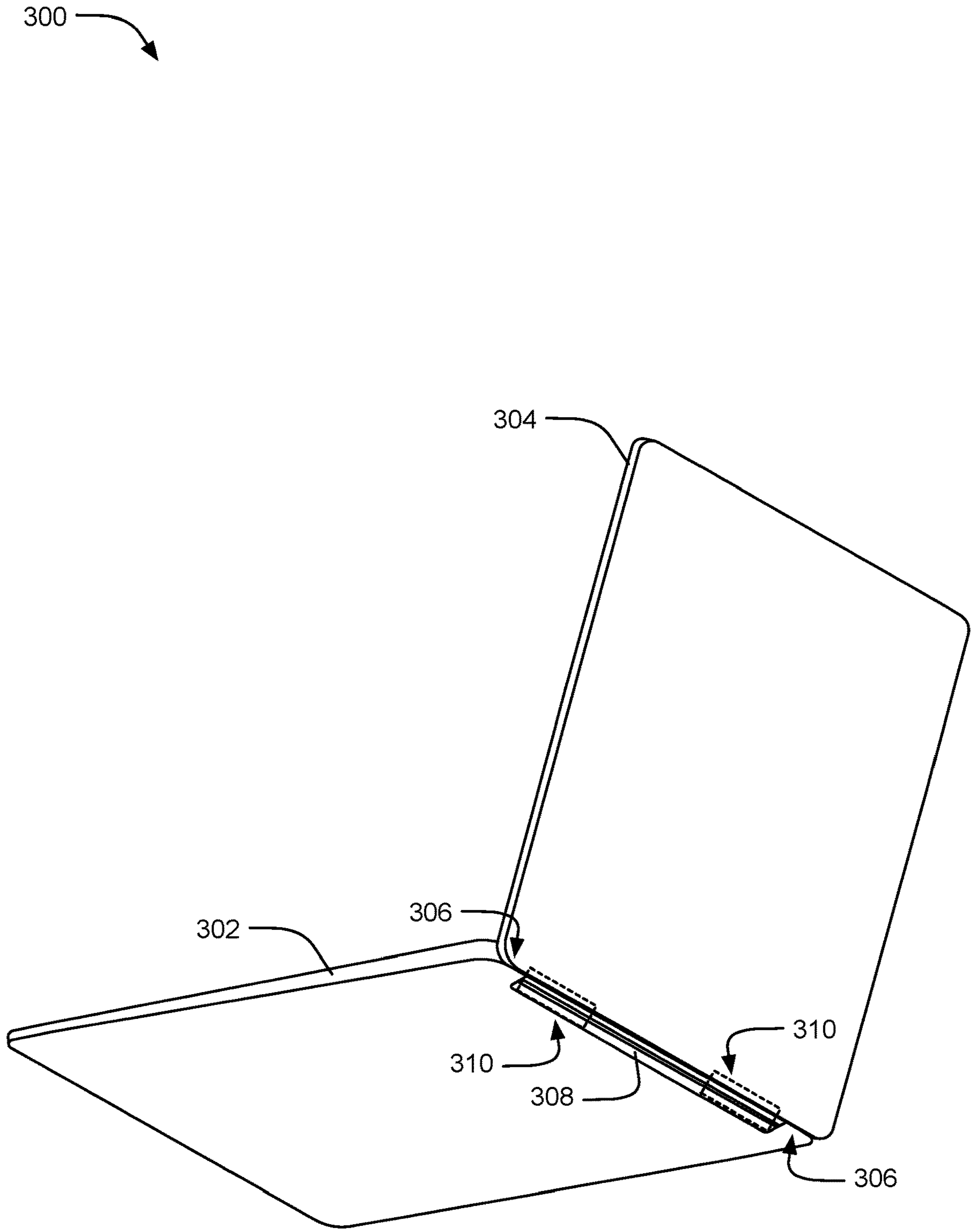
FIG. 3 illustrates a bottom perspective view of an example computing device.

FIG. 3 illustrates a bottom perspective view of an example computing device 300. The computing device 300 includes a first metal computing device chassis component 302 and a second metal computing device chassis component 304 mechanically connected by one or more hinge connectors (not shown but potentially located at one or both of positions 306). The hinge connectors allow the second metal computing device chassis component 304 to open and close relative to the first metal computing device chassis component 302. A venting aperture 308 is located across a substantial width (e.g., from side to side) of the first metal computing device chassis component 302.

In the illustrated example, a primary antenna and an antenna bracket are positioned at each of the locations 310 (marked by dashed boxes), although other numbers and positions of antenna/bracket pairs are contemplated. In this configuration, RF signals radiated from the primary antenna are not substantially shielded from the venting aperture 308 by metal components within the first metal computing device chassis component 302, such as a metal hinge connector. Accordingly, select RF signals (e.g., higher frequency RF signals) are effectively radiated through and/or by the venting aperture 308 during operation.

As for RF signals for which the aperture 308 does not acts as an effective RF window and/or radiator (e.g., because of the aperture's dimensions), the primary antenna capacitively couples to the second metal computing device chassis component 304, which includes a display, via the one or more metal hinge connectors. The primary antenna is tuned via an RF matching component (not shown) to cause the second metal computing device chassis component 304 to radiate these RF signals that are substantially shielded by the first metal computing device chassis component 302, despite the presence of the venting aperture 308. As such, the second metal computing device chassis component 304 includes a metal hinge connector, the display, and other metal elements that can radiate the RF signals outside the shielded physical confines of the first metal computing device chassis component 302.

Figure 4:
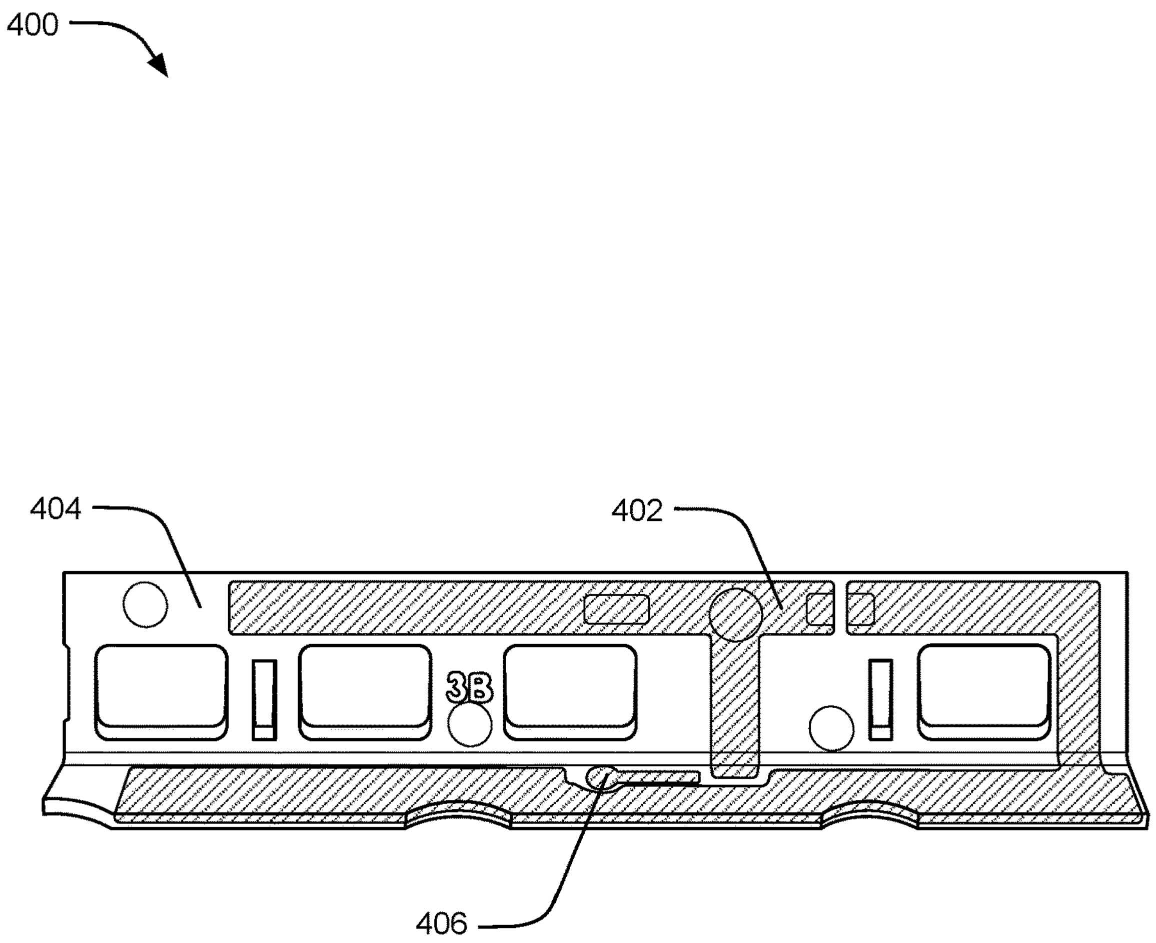
FIG. 4 illustrates an example pair of a primary antenna supported on an antenna bracket.

FIG. 4 illustrates an example pair 400 of a primary antenna 402 supported on an antenna bracket 404. In some implementations, such a pair 400 would be positioned to either side of a computing device to provide wireless communications in multiple frequency bands.

In an assembled computing device, the pair 400 is enclosed in a first metal computing device chassis component, which would shield some of the RF signals generated by the pair 400. Accordingly, the pair 400 is designed to be positioned within the first metal computing device chassis component near an aperture capable of acting as an effective RF window and/or radiator for at least some of the RF signals radiated from the primary antenna 402.

The primary antenna 402 is illustrated in the form of a PIFA antenna deposited and/or mounted on the antenna bracket 404, although other types of antennas may be employed in other implementations. Accordingly, the pair 400 is designed to be positioned to capacitively couple with the second metal computing device chassis component through a metal hinge connector so that the second metal computing device chassis component (e.g., including a display) radiates in an otherwise blocked frequency band. A Pi-network matching circuit 406 is also deposited on the antenna bracket, although other types of matching circuits may be employed to tune the primary antenna 402 (e.g., to tune the primary antenna 402 to capacitively drive the second metal computing device chassis component to radiate in the otherwise blocked frequency band). The metal hinge connector provides at least a technical benefit of enhancing the capacitive coupling of the second metal computing device chassis component via the metal hinge connector and the radiation by the second metal computing device chassis component.

Figure 5:
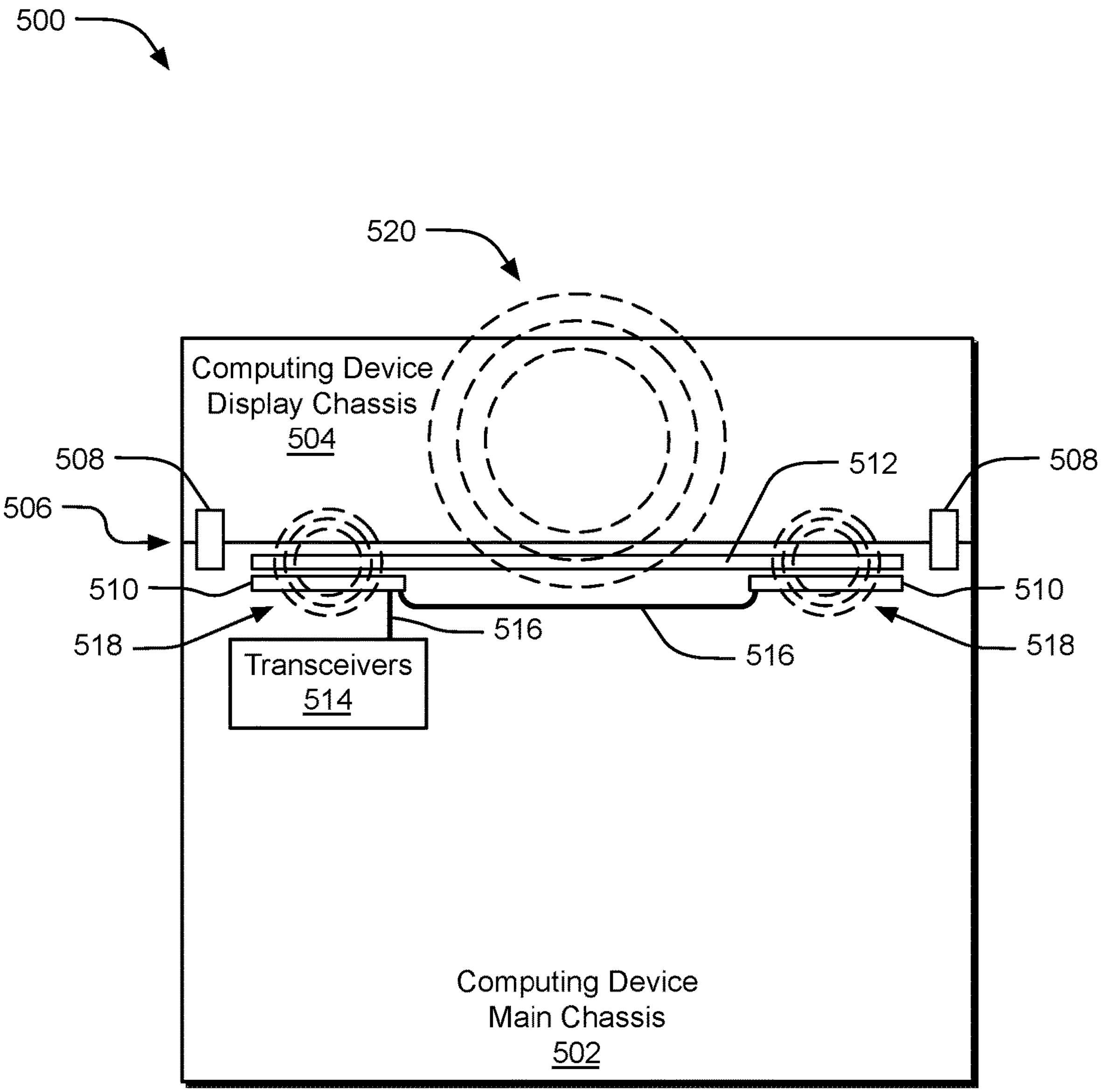
FIG. 5 illustrates an example computing device including a coupled chassis antenna system.

FIG. 5 illustrates an example computing device 500 including a coupled chassis antenna system. The computing device 500 includes a first metal computing device chassis component (labeled computing device main chassis 502), which contains the primary antenna, and a second metal computing device chassis component (labeled computing device display chassis 504), which includes a display. The computing device main chassis 502 and the computing device display chassis 504 are separated by a junction 506 and movably connected by one or more hinge connectors 508.

In FIG. 5, primary antennas 510 are positioned within the computing device main chassis 502 near a venting aperture 512. One or more transceivers 514 are connected via a coaxial cable 516 to drive the primary antennas 510. Connecting the transceivers 514 in this manner provides a technical benefit of driving two antennas from a single signal source, potentially reducing the volume occupied by these components and/or easing routing and connections among these and other components.

In the configuration illustrated in FIG. 5, RF signals radiated from the primary antenna are not substantially shielded by metal components within the computing device main chassis 502, such as the one or more hinge connectors 508 (which typically include metal material). Accordingly, select RF signals for which the venting aperture 512 acts as an effective RF window and/or radiator emanate from the venting aperture 512 during operation (see the radiation patterns 518 represented by the concentric dashed circles).

As for RF signals for which the venting aperture 512 acts to substantially attenuate the signals (e.g., because of the aperture's dimensions), the primary antennas 510 capacitively couple to the computing device display chassis 504, via the one or more hinge connectors 508. The primary antenna 510 is tuned via an RF matching component (not shown) to cause the computing device display chassis 504 to radiate these otherwise shielded RF signals. As such, the computing device display chassis 504 includes the one or more hinge connectors 508, the display, and other metal elements that can radiate the RF signals outside the shielded physical confines of the computing device main chassis 502 (see the radiation patterns 520 represented by the concentric dashed circles).

Figure 6:
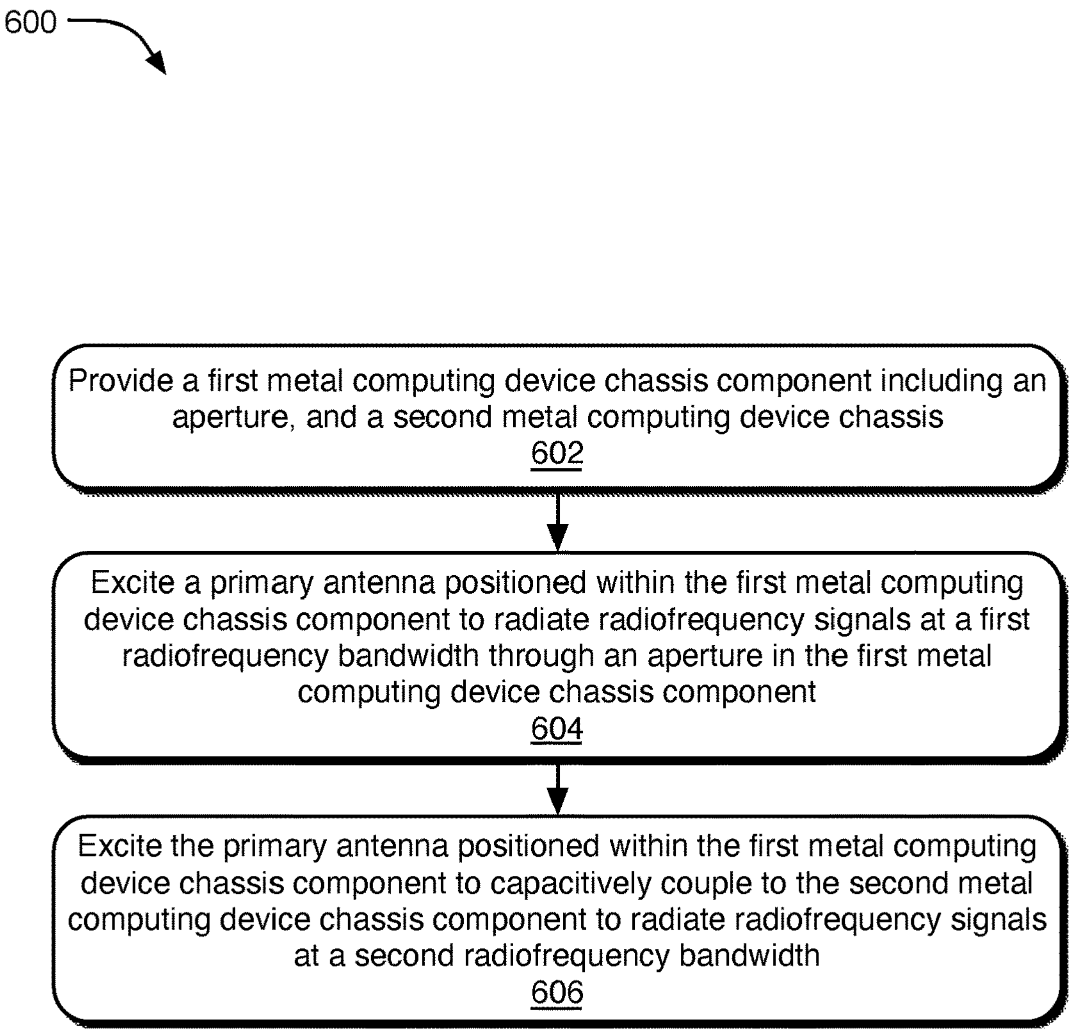
FIG. 6 illustrates example operations for communicating via a coupled chassis antenna system.

FIG. 6 illustrates example operations 600 for communicating via a coupled chassis antenna system. A providing operation 602 provides a first metal computing device chassis component including an aperture, and a second metal computing device chassis component including a display and further including a hinge connector mechanically and movably connecting the second metal computing device chassis component to the first metal computing device chassis. An excitation operation 604 excites a primary antenna positioned within the first metal computing device chassis component. The primary antenna is configured to radiate radiofrequency signals at a first radiofrequency bandwidth through the aperture in the first metal computing device chassis component. Another excitation operation 606 excites the second metal computing device chassis component to capacitively couple to the second metal computing device chassis component to radiate radiofrequency signals at a second radiofrequency bandwidth.

Figure 7:
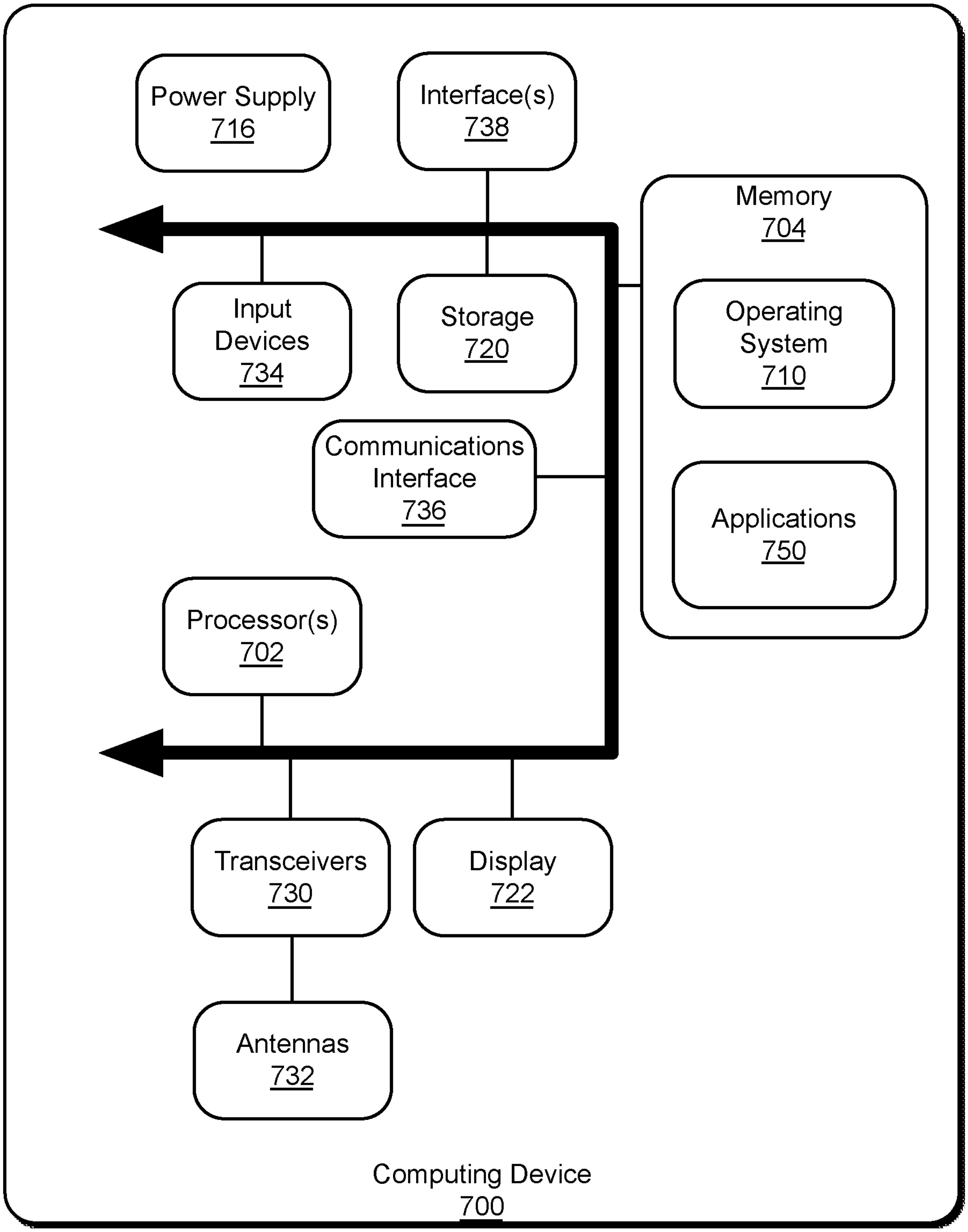
FIG. 7 illustrates an example computing device for implementing the features and operations of the described technology.

FIG. 7 illustrates an example computing device 700 for implementing the features and operations of the described technology. The computing device 700 may embody a remote-control device or a physical controlled device and is an example network-connected and/or network-capable device and may be a client device, such as a laptop, mobile device, desktop, tablet; a server/cloud device; an internet-of-things device; an electronic accessory; or another electronic device. The computing device 700 includes one or more processor(s) 702 and a memory 704. The memory 704 generally includes both volatile memory (e.g., RAM) and nonvolatile memory (e.g., flash memory). An operating system 710 resides in the memory 704 and is executed by the processor(s) 702.

In an example computing device 700, as shown in FIG. 7, one or more modules or segments, such as applications 750, antenna control software, communication software, and other modules are loaded into the operating system 710 on the memory 704 and/or storage 720 and executed by processor(s) 702. The storage 720 may include one or more tangible storage media devices and may store communication parameters or other data. The storage 720 may be local to the computing device 700 or may be remote and communicatively connected to the computing device 700.

The computing device 700 includes a power supply 716, which is powered by one or more batteries or other power sources, and which provides power to other components of the computing device 700. The power supply 716 may also be connected to an external power source that overrides or recharges the built-in batteries or other power sources.

The computing device 700 may include one or more communication transceivers 730, which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a communications interface 736 (e.g., a network adapter), which is a type of computing device. The computing device 700 may use the communications interface 736 and any other types of computing devices for establishing connections over a wide-area network (WAN) or local-area network (LAN). It should be appreciated that the network connections shown are examples and that other computing devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738, such as a serial port interface, parallel port, or universal serial bus (USB). The computing device 700 may further include a display 722, such as a touch screen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

While this specification contains many specific implementation details, these should not be construed as limitations on the scope of any technologies or of what may be claimed but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. Furthermore, it should be understood that logical operations may be performed in any order, adding or omitting operations as desired, regardless of whether operations are labeled or identified as optional, unless explicitly claimed otherwise or a specific order is inherently necessitated by the claim language. In some cases, the actions recited in the claims can be performed in a different order and still achieve desirable results. In certain circumstances, multitasking and parallel processing may be advantageous. The logical operations making up implementations of the technology described herein may be referred to variously as operations, steps, objects, or modules.

Moreover, the separation of various system components in the implementations described above should not be understood as requiring such separation in all implementations, and it should be understood that the described program components and systems can generally be integrated together into a single software product or packaged into multiple software products. Thus, particular implementations of the subject matter have been described. Other implementations are within the scope of the following claims. Nevertheless, it will be understood that various modifications can be made without departing from the spirit and scope of the recited claims.

Clause 1. A computing device comprising: a first metal computing device chassis component including an aperture; a second metal computing device chassis component including a display and a hinge connector mechanically and movably connecting the second metal computing device chassis component to the first metal computing device chassis component; and a primary antenna positioned within the first metal computing device chassis component, the primary antenna being configured to radiate radiofrequency signals at a first radiofrequency bandwidth through the aperture in the first metal computing device chassis component and to capacitively couple to the second metal computing device chassis component to radiate radiofrequency signals at a second radiofrequency bandwidth.

Clause 2. The computing device of clause 1, further comprising: a transceiver positioned with the first metal computing device chassis component and configured to drive the primary antenna to radiate the radiofrequency signals at the first radiofrequency bandwidth.

Clause 3. The computing device of clause 2, wherein the transceiver is connected to electrically drive the primary antenna via a coaxial cable.

Clause 4. The computing device of clause 1, wherein the first radiofrequency bandwidth is centered at a higher frequency than the second radiofrequency bandwidth.

Clause 5. The computing device of clause 1, wherein the aperture is formed in an exterior metal frame of the first metal computing device chassis component and has a dimension smaller than half a wavelength of operating frequencies in the first radiofrequency bandwidth, causing the aperture in the first metal computing device chassis component to substantially attenuate the radiofrequency signals in the first radiofrequency bandwidth.

Clause 6. The computing device of clause 1, wherein the primary antenna is a PIFA antenna.

Clause 7. The computing device of clause 1, wherein the primary antenna is matched using a Pi-network matching circuit.

Clause 8. The computing device of clause 1, wherein the hinge connector is positioned between the primary antenna and the second metal computing device chassis component when the first metal computing device chassis component and the second metal computing device chassis component are in an open position relative to each other.

Clause 9. The computing device of clause 1, wherein the second radiofrequency bandwidth includes 2.4 GHz.

Clause 10. The computing device of clause 1, wherein the first radiofrequency bandwidth includes 5 GHz or 6 GHz.

Clause 11. A method of communicating radiofrequency signals from a computing device, the method comprising: exciting a primary antenna positioned within a first metal computing device chassis component including an aperture, wherein the first metal computing device chassis component is mechanically and movably coupled to a second metal computing device chassis component by a hinge connector and the second metal computing device chassis component includes a display, the primary antenna being configured to radiate the radiofrequency signals at a first radiofrequency bandwidth through the aperture in the first metal computing device chassis component and to capacitively couple to the second metal computing device chassis component to radiate the radiofrequency signals at a second radiofrequency bandwidth.

Clause 12. The method of clause 11, further comprising: electrically driving the primary antenna to radiate the radiofrequency signals at the first radiofrequency bandwidth using a transceiver positioned with the first metal computing device chassis component.

Clause 13. The method of clause 11, further comprising: electrically driving the primary antenna via a transceiver connected by a coaxial cable.

Clause 14. The method of clause 11, wherein the first radiofrequency bandwidth is centered at a higher frequency than the second radiofrequency bandwidth.

Clause 15. The method of clause 11, wherein the aperture is formed in an exterior metal frame of the first metal computing device chassis component and has a dimension smaller than half a wavelength of operating frequencies in the first radiofrequency bandwidth in the first radiofrequency bandwidth, causing the aperture in the first metal computing device chassis component to substantially attenuate the radiofrequency signals in the first radiofrequency bandwidth.

Clause 16. The method of clause 11, wherein the primary antenna is a PIFA antenna.

Clause 17. The method of clause 11, wherein the primary antenna is matched using a Pi-network matching circuit.

Clause 18. The method of clause 11, wherein the hinge connector is positioned between the primary antenna and the second metal computing device chassis component when the first metal computing device chassis component and the second metal computing device chassis component are in an open position relative to each other.

Clause 19. The method of clause 11, wherein the second radiofrequency bandwidth includes 2.4 GHz.

Clause 20. The method of clause 11, wherein the first radiofrequency bandwidth includes 5 GHz or 6 GHz.

Clause 21. A system for communicating radiofrequency signals from a computing device, the system comprising: means for exciting a primary antenna positioned within a first metal computing device chassis component including an aperture, wherein the first metal computing device chassis component is mechanically and movably coupled to a second metal computing device chassis component by a hinge connector and the second metal computing device chassis component includes a display, the primary antenna being configured to radiate the radiofrequency signals at a first radiofrequency bandwidth through the aperture in the first metal computing device chassis component and to capacitively couple to the second metal computing device chassis component to radiate the radiofrequency signals at a second radiofrequency bandwidth.

Clause 22. The system of clause 21, further comprising: means for electrically driving the primary antenna to radiate the radiofrequency signals at the first radiofrequency bandwidth using a transceiver positioned with the first metal computing device chassis component.

Clause 23. The system of clause 21, further comprising: means for electrically driving the primary antenna via a transceiver connected by a coaxial cable.

Clause 24. The system of clause 21, wherein the first radiofrequency bandwidth is centered at a higher frequency than the second radiofrequency bandwidth.

Clause 25. The system of clause 21, wherein the aperture is formed in an exterior metal frame of the first metal computing device chassis component and has a dimension smaller than half a wavelength of operating frequencies in the first radiofrequency bandwidth in the first radiofrequency bandwidth, causing the aperture in the first metal computing device chassis component to substantially attenuate the radiofrequency signals in the first radiofrequency bandwidth.

Clause 26. The system of clause 21, wherein the primary antenna is a PIFA antenna.

Clause 27. The system of clause 21, wherein the primary antenna is matched using a Pi-network matching circuit.

Clause 28. The system of clause 21, wherein the hinge connector is positioned between the primary antenna and the second metal computing device chassis component when the first metal computing device chassis component and the second metal computing device chassis component are in an open position relative to each other.

Clause 29. The system of clause 21, wherein the second radiofrequency bandwidth includes 2.4 GHz.

Clause 30. The system of clause 21, wherein the first radiofrequency bandwidth includes 5 GHz or 6 GHz.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A computing device comprising:

a first metal computing device chassis component including an aperture;

a second metal computing device chassis component including a display and a hinge connector mechanically and movably connecting the second metal computing device chassis component to the first metal computing device chassis component; and a primary antenna positioned within the first metal computing device chassis component, the primary antenna being configured to radiate radiofrequency signals at a first radiofrequency bandwidth through the aperture in the first metal computing device chassis component and to capacitively couple to the second metal computing device chassis component to radiate radiofrequency signals at a second radiofrequency bandwidth.

2. The computing device of claim 1, further comprising:

a transceiver positioned with the first metal computing device chassis component and configured to drive the primary antenna to radiate the radiofrequency signals at the first radiofrequency bandwidth.

3. The computing device of claim 2, wherein the transceiver is connected to electrically drive the primary antenna via a coaxial cable.

4. The computing device of claim 1, wherein the first radiofrequency bandwidth is centered at a higher frequency than the second radiofrequency bandwidth.

5. The computing device of claim 1, wherein the aperture is formed in an exterior metal frame of the first metal computing device chassis component and has a dimension smaller than half a wavelength of operating frequencies in the second radiofrequency bandwidth, causing the aperture in the first metal computing device chassis component to substantially attenuate the radiofrequency signals in the second radiofrequency bandwidth.

6. The computing device of claim 1, wherein the primary antenna is a PIFA antenna.

7. The computing device of claim 1, wherein the primary antenna is matched using a Pi-network matching circuit.

8. The computing device of claim 1, wherein the hinge connector is positioned between the primary antenna and the second metal computing device chassis component when the first metal computing device chassis component and the second metal computing device chassis component are in an open position relative to each other.

9. The computing device of claim 1, wherein the second radiofrequency bandwidth includes 2.4 GHz.

10. The computing device of claim 1, wherein the first radiofrequency bandwidth includes 5 GHz or 6 GHz.

11. The computing device of claim 1, wherein the aperture is positioned between the primary antenna and the second metal computing device chassis component.

12. The computing device of claim 11, wherein selection between radiation of the radiofrequency signals through the aperture or via capacitively coupling to the second metal computing device chassis component is based on whether the radiofrequency signals are shielded by the aperture.

13. A method of communicating radiofrequency signals from a computing device, the method comprising:

exciting a primary antenna positioned within a first metal computing device chassis component including an aperture, wherein the first metal computing device chassis component is mechanically and movably coupled to a second metal computing device chassis component by a hinge connector and the second metal computing device chassis component includes a display, the primary antenna being configured to radiate the radiofrequency signals at a first radiofrequency bandwidth through the aperture in the first metal computing device chassis component and to capacitively couple to the second metal computing device chassis component to radiate the radiofrequency signals at a second radiofrequency bandwidth.

14. The method of claim 13, further comprising:

electrically driving the primary antenna to radiate the radiofrequency signals at the first radiofrequency bandwidth using a transceiver positioned with the first metal computing device chassis component.

15. The method of claim 13, further comprising:

electrically driving the primary antenna via a transceiver connected by a coaxial cable.

16. The method of claim 13, wherein the first radiofrequency bandwidth is centered at a higher frequency than the second radiofrequency bandwidth.

17. The method of claim 13, wherein the aperture is formed in an exterior metal frame of the first metal computing device chassis component and has a dimension smaller than half a wavelength of operating frequencies in the second radiofrequency bandwidth, causing the aperture in the first metal computing device chassis component to substantially attenuate the radiofrequency signals in the second radiofrequency bandwidth.

18. The method of claim 13, wherein the primary antenna is a PIFA antenna.

19. The method of claim 13, wherein the primary antenna is matched using a Pi-network matching circuit.

20. The method of claim 13, wherein the hinge connector is positioned between the primary antenna and the second metal computing device chassis component when the first metal computing device chassis component and the second metal computing device chassis component are in an open position relative to each other.

21. The method of claim 13, wherein the second radiofrequency bandwidth includes 2.4 GHz.

22. The method of claim 13, wherein the first radiofrequency bandwidth includes 5 GHz or 6 GHz.

* * * * *